(No Model.) 3 Sheets—Sheet 1.

J. A. BOWDEN.
FILTER.

No. 530,008. Patented Nov. 27, 1894.

WITNESSES
H. Clough.
D. W. Bradford.

INVENTOR
Junius A. Bowden
By Parker & Burton
Attorneys.

(No Model.) 3 Sheets—Sheet 2.
J. A. BOWDEN.
FILTER.

No. 530,008. Patented Nov. 27, 1894.

WITNESSES
F. Clough.
D. W. Bradford

INVENTOR
Junius A. Bowden
By Parker & Burton
Attorneys.

(No Model.) 3 Sheets—Sheet 3.
J. A. BOWDEN.
FILTER.

No. 530,008. Patented Nov. 27, 1894.

WITNESSES
F. Clough.
L. H. Bradford.

INVENTOR
Junius A. Bowden
By Parker & Burton.
Attorneys.

UNITED STATES PATENT OFFICE.

JUNIUS A. BOWDEN, OF DETROIT, MICHIGAN.

FILTER.

SPECIFICATION forming part of Letters Patent No. 530,008, dated November 27, 1894.

Application filed May 21, 1894. Serial No. 511,900. (No model.)

*To all whom it may concern:*

Be it known that I, JUNIUS A. BOWDEN, a citizen of the United States, residing at Detroit, county of Wayne, State of Michigan, have invented a certain new and useful Improvement in Filters; and I declare the following to be a full, clear, and exact description of the same, such as will enable others skilled in the art to which it pertains to make and use the same, reference being had to the accompanying drawings, which form a part of this specification.

My invention relates to filters, and it consists in various improvements in construction and mode of operation upon the apparatus described in my two former applications, Serial No. 502,066, filed March 2, 1894, and Serial No. 508,798, filed April 24, 1894,—all of which is more particularly hereinafter pointed out and claimed.

Figure 1:
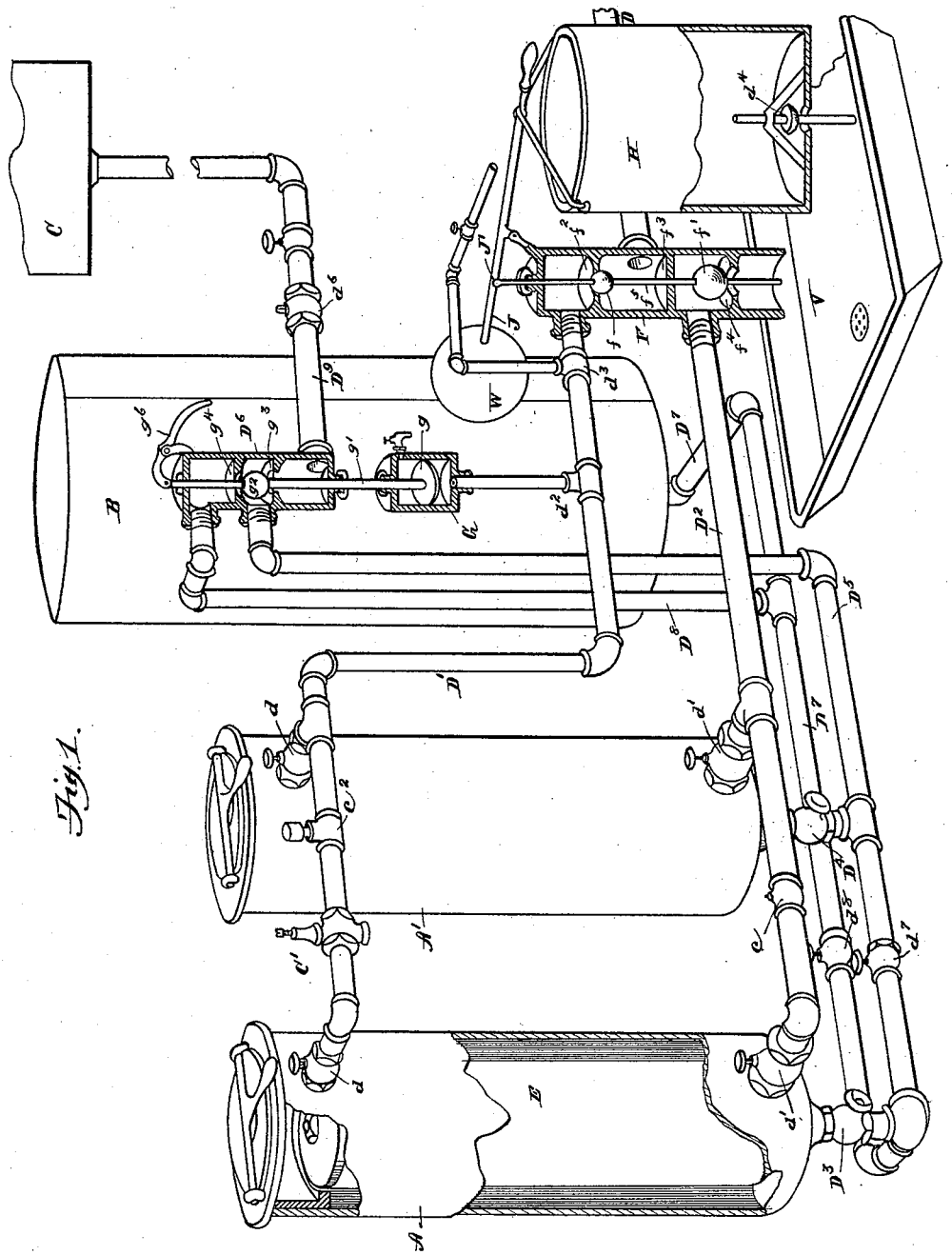
Figure 2:
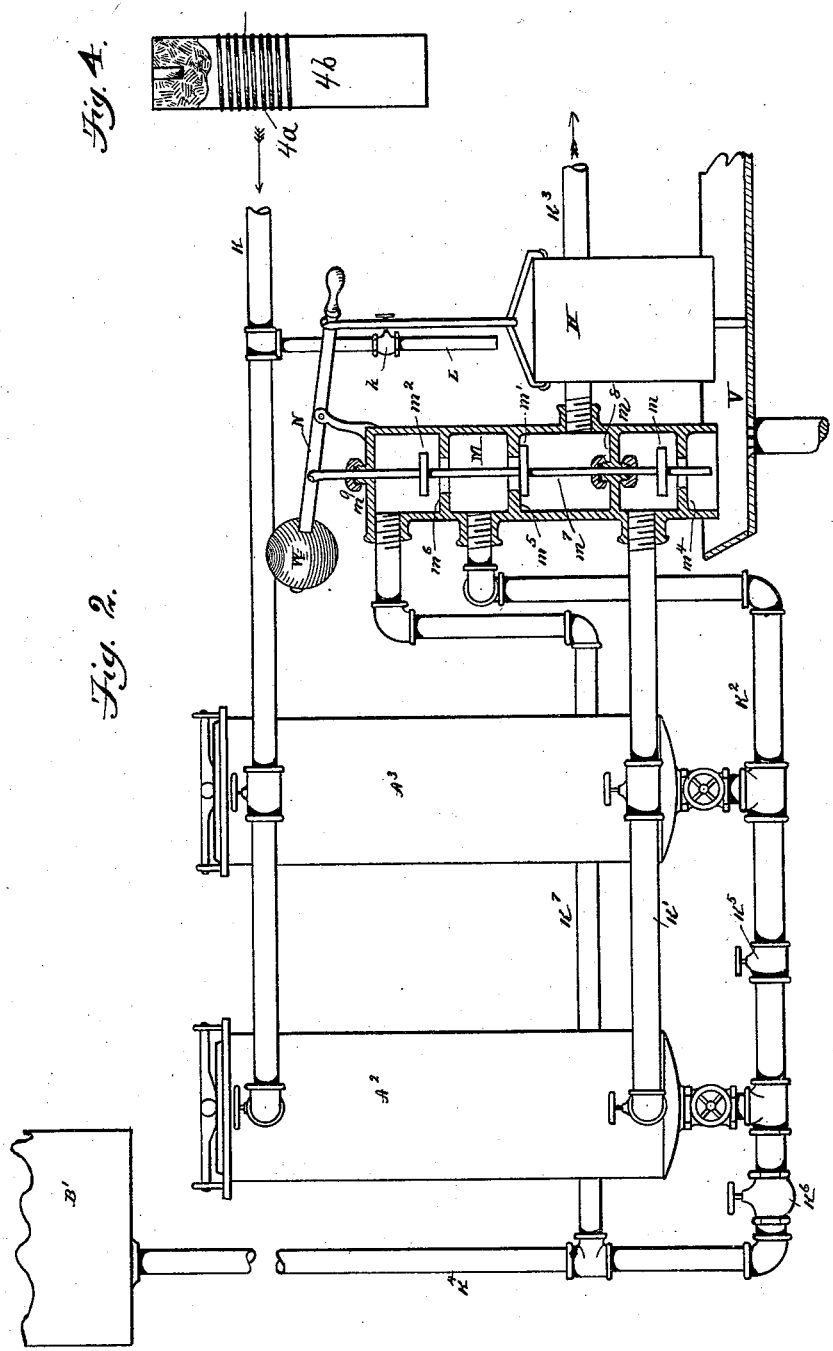
Figure 3:
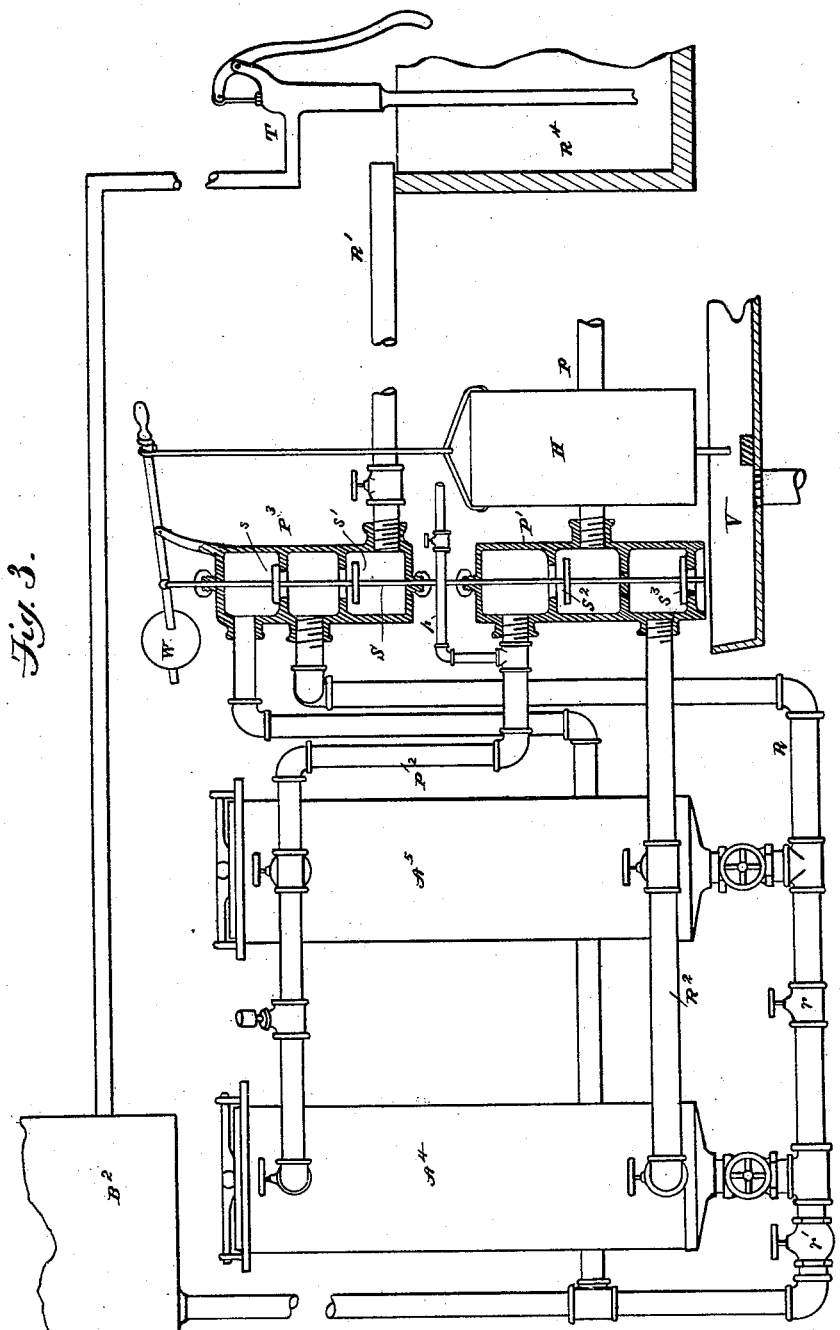

In the drawings, Figure 1 is a perspective view of one form of my filtering apparatus, with certain parts broken away in order to show the internal construction. Fig. 2 is an elevation of a modification, in which the supply is not shut off during the cleansing operation. Fig. 3 is an elevation of another form in which the supply of unfiltered water is shut off during the operation of cleansing. Fig. 4 illustrates the manner in which the filtering tubes are supported against the internal bursting pressure due to the head of filtered water during the operation of cleansing.

Similar letters and figures refer to similar parts.

In Fig. 1, A and A' represent two filtering chambers.

B represents the compression storage tank; C, a receptacle for filtered water; D, an inlet pipe for unfiltered water.

D' is the inlet pipe continued, and is joined by valvular connections $d\ d$ with the upper portion of the filtering cases. The filters are of the same general form of construction as those shown in my previous applications.

E represents a filtering cylinder in the filtering case A, the case being partially broken away in order to show both the filtering cylinder and its head arranged within the case A.

$D^2$ is a pipe for waste water, which communicates with the lower portion of the cases A, A', and with the chambers surrounding the filtering stones. It communicates by valvular connections $d'\ d'$ with the bottom of the filter cases.

$D^3$ and $D^4$ are valvular connections with the interior of the filter stones, and constitute the outlets for filtered water.

$D^5$ is the main outlet pipe for filtered water which enters into a valve chest $D^6$.

$D^7$ is a branch which enters in the bottom of the storage compression tank B. From this pipe $D^7$ another pipe, $D^8$, branches, which also enters into the valve chest $D^6$.

$D^9$ is the continuation of the outlet for filtered water leading from the valve chest $D^6$ to the storage tank C.

F is another valve chamber, the drawing of which, like that of $D^6$, is sectioned for the purpose of showing valves therein and their mode of operation. Leading from the pipe D, at $d^2$ and $d^3$, are two branches, that from $d^2$ entering into a cylinder G (the drawing of which is also sectioned for the purpose of showing the internal arrangements). $d^3$ empties into a movable or dumping tank H, the opening therefrom being controlled by a valve $d^4$. Within the cylinder G is a piston $g$, from which projects through the valve case $D^6$ a piston rod $g'$, the piston being movable in the cylinder G and substantially water tight therein. The cylinder G is on the same longitudinal axis with the valve chest $D^6$, and across the latter are two perforated diaphragms $g^3$ $g^4$, and between the diaphragms on the stem $g'$ is a ball valve that seats itself either in the orifice through the diaphragm above it or in the orifice through the diaphragm below it. Its action in taking either the one or the other of the two positions is controlled by the water in a manner which will be explained. Appropriate stuffing boxes are used to guard the openings to the valve stem $g'$ in their respective cylinder G and valve chest $D^6$. The end of the valve stem $g'$ which rises above the case $D^6$ engages with a suitably fulcrumed hand lever $g^6$. It is obvious that the motion of the piston $g$ will be transferred to the valve $g^2$ so as to operate it to close the orifices alternately in the diaphragms $g^3\ g^4$. The pipe for filtered water, $D^5$, enters the valve chest $D^6$ between the two diaphragms $g^3\ g^4$. As shown in the drawings, the valve $g^2$ is midway between the two openings, showing communication from the chamber in which it is located with both chambers, one at either end of the valve chest $D^6$. The pipe $D^9$ communicates with the lower chamber in $D^6$, so that when the valve $g^2$ is raised, there is a continued current from the pipe $D^5$ to the pipe $D^9$, and to the tank C for filtered water. Pressure from under the piston $g$ will cause it to rise and close the orifice on the diaphragm $g^4$, and thus permit the continued communication as hereinbefore stated between the pipes $D^5$ and $D^9$. These devices are all intended to filter water under pressure with a definite head. In various locations, this head is variable. It may be no more than five or ten pounds in one place, and it may be even as high as a hundred in another; but it is assumed that there will always be pressure enough in the service pipe D, as continued, to operate the piston $g$. Whenever the pressure beneath the piston $g$ is removed, the valve $g^2$ will fall and open the passage through the diaphragm $g^4$ and close that in $g^3$. In such case, the passage for filtered water between the pipes $D^5$ and $D^9$ is at once cut off. In the pipe $D^9$, there is an ordinary check valve located at $d^6$, which prevents any return flow of water from the tank C.

The filter A is disconnected from the filter A' by closing the valve in pipe $D^5$, at $d^7$. This filter A therefore delivers filtered water through the pipe $D^7$ into the compression tank B; whereas, the filter A' delivers filtered water into the storage tank C. In this figure, I have illustrated only one filter delivering water into the storage tank C, but a battery of any number may be used by simply making appropriate connections with the service pipe D, and exactly similar connections as $D^4$ with the delivery pipe $D^5$; but, in this figure, I have only illustrated the filter for furnishing filtered water for general purposes, as others would be mere duplications, the object being to illustrate the arrangement of one filtering chamber to deliver water to a compression tank for washing purposes only, and a battery of filters consisting of one or more that shall deliver water for service purposes.

The filter A' need not be of the same size as A. It may be of any size commensurate with the circumstances or facility of manufacture; or, in other words, the filter A, which is used merely for the purpose of storing water in a compression tank for washing, may be much smaller than the filter A', instead of duplicating the one shown at A', the proportions being substantially those of the service required from each. It is not necessary, however, that filter A should be idle after the compression tank B is filled, as, by opening the valves at $d^7$ and closing the valve at $d^8$, the filtered water flowing from it is delivered to the storage tank C. Whenever, however, it is required to do duty to replenish the compression tank, the valve at $d^8$ is opened and that at $d^7$ is closed. In such case, the filtered water passes through the pipe $D^7$ into the bottom of the compression tank B, and also fills the pipe $D^8$ and the upper chamber above the diaphragm in the valve chest $D^6$. As the water rises in the compression tank B, it compresses the air above it until the pressure therein is substantially equal to that of the original pressure furnished by the service pipe D. In case the service pressure is very high, as—say one hundred pounds to the inch, and the washing pressure cannot exceed— say thirty pounds to the inch, owing to the danger of bursting the filtering cylinders E, it would obviously be necessary to prevent the pressure in the compression tank from exceeding a safe limit; and this is done by interposing an ordinary regulating valve at C' in the service pipe leading to the filter A. A check valve is placed in the pipe $D^2$, at $c$, which prevents the unfiltered water from passing from the chambers surrounding the filtering stone in the filter A' to the chamber F surrounding the stone in the filter A, without preventing the passage of the waste water from the filter A' in the opposite direction. Thus, the pressure in the filter A never exceeds the set pressure, and, consequently, the resultant pressure in the compression tank B is kept within safe limits. Interposed between the two sections of the inlet pipe D is, as hereinbefore stated, the valve chest F. Within this are two valves $f$ and $f'$, and it is divided into separate chambers by perforated diaphragms, $f^2$, $f^3$ and $f^4$. The upper and lower of these diaphragms, $f^2$ and $f^4$, are formed with valve seats in the perforations, the one at $f^2$ being adapted to receive the valve $f$ upon its rising, and the one at $f^4$ being formed to receive the valve $f'$ upon its descending. The diaphragm $f^3$ is merely perforated, and through it passes the valve stem $f^5$, substantially water tight, although it is not essential it should be strictly so. The valve stem $f^5$ passes out through a stuffing box of the ordinary construction at the top of the valve chest F, and pivotally engages a swinging lever beam J which is pivoted at J'. One end of this lever J carries a sliding weight W, and the other end, by any appropriate means, a dumping tank H, which carries a valve $d^4$ in its bottom. This operates by means of the valve stem, when the dumping tank H is opened, and permits the contents of the tank to be discharged into the sink V. The weight W and the dumping tank H are both adjustable on the beam J, and are so adjusted that, when any assignable quantity of water is deposited by means of the pipe $d^3$ therein, it descends, closes the valve $f$ in the valve seat $f^2$, and opens the valve $f'$ from its seat $f^4$. The closure of the valve $f$ at once cuts off communication between the two sections of the service pipe D. This destroys the pressure resulting from the initial head which has been transmitted by the service pipe to the piston $g$. The withdrawal of this pressure causes the valve $g^2$ to descend, and thus cuts off the communication between the discharge pipes $D^5$ and $D^9$. At the same instant, the pressure within the filter $A'$, and any other filters that may be on the same service pipe $D'$, will be destroyed. The pressure of air in the compression tank B, resulting from initial pressure—or the initial pressure reduced,—commences to force back from the compression tank to the pipe $D^7$ the water which has been stored therein during the filtering period, and this clean water, passing in a reverse direction through the filters, cleans them and passes out through the connection $d'$ into the waste pipe $d^2$, and from thence into the sink V. The valve at $d^7$ being closed (this being a hand valve and generally kept closed), the water for the reverse washing for all filters, except the filter A, takes a course through the pipes $D^7 D^8$ into the upper chamber of the valve chest $D^6$, through the opening in the diaphragm $g^4$, and from thence into the pipe $D^5$, then through the outlet $D^4$ into the interior of the filtering cylinder in the filter $A'$, and thence through the filter stone and to the waste connection $d'$ into the pipe $D^2$, and from thence into the sink V.

On the discharge of the water through the dumping tank H, the counterweight W will cause it to rise, reversing the valves $f$ and $f'$ from the position shown, reopening the connection with the service pipe D, and restoring the filtering operation. At the same time the water will rise in the cylinder G, lift the piston $g$, seat the valve $g^2$ on its seat in the diaphragm $g^4$, and thereby stop the reverse flow of water from the tank B into the filter $A'$; but the passage from the filter A into the tank B will be left open.

In the pipe $D'$ is located a check valve $C^2$, in a vent passage, which permits the air to enter the pipe on the withdrawal of pressure. This facilitates the quick discharge of the water during the period of washing. During the period of washing there is no pressure of water into the drip pipe, and the water ceases to run from that pipe into the dump tank H.

In Fig. 2, I have shown a variation of the same principle of employing a separate filter to furnish water for the reverse washing, but, instead of employing a compression tank, I employ a storage tank located at a sufficient height to give the required head. The elevation at which this may be placed is limited by the initial pressure. In this figure, $A^2 A^3$ represent the filters; $B'$, a storage tank for filtered water for washing filters. K is the inlet pipe from the source of supply. $K'$ is the waste discharge. $K^2 K^3$ are discharge pipes for filtered water. $K^4$ is the pipe leading to the wash water storage tank $B'$. $K^5$ is a valve ordinarily kept closed. $K^6$ is a valve shutting off communication between the wash water tank $B'$ and the filters.

M is a valve chest, containing valves $m, m'$ and $m^2$. These valves close openings in diaphragms $m^4$, $m^5$ and $m^6$ in such way that, as the opening in diaphragm $m^5$ is closed, those in $m^4$ and $m^6$ are open. These valves are all rigidly attached to one valve rod or stem, $m^7$, which extends through a stuffing box in a diaphragm $m^8$, and through the upper head $m^9$ of the valve chest M, and is connected with a balanced lever N, upon one end of which is a sliding weight W, and on its other end is hung a dumping tank H. As the dumping tank and balanced lever are substantially the same as shown in Fig. 1, it is unnecessary to describe them in detail. The tank is operated by a light flow of water from the service pipe K through the small pipe L, and the flow is regulated by a valve at $k$. It is obvious that the lever N and the valves in the valve chest M are operated in a manner similar to that already described with reference to the tank H and valves in the valve chest F. The service pipe K communicates with the chambers in the interior of the filter cases $A^2 A^3$, and, under the service pressure, water is forced through the filtering cylinders, from whence it is discharged into the pipe $K^2$, and from thence flows into an intermediate chamber in the valve chest M, between the diaphragms $m^5$ and $m^6$. If the valve $m^2$ be closed, and the valve $m'$ be open, it will thence flow out through the pipe $K^3$ into any convenient receptacle, as a storage tank. If the valve $K^5$ in the pipe $K^2$ be closed, all the filtered water from the filter $A^2$ will be carried through the pipe $K^4$ past the valve $K^6$, and will be stored in the wash water storage tank $B'$. As this tank is elevated, as hereinbefore stated, the water is stored in it by a pressure which corresponds to the service pressure (diminished, of course, by the frictional loss).

Branching from the pipe $K^4$ is a pipe $K^7$, which enters into the upper compartment of valve chest M. The pipe $K'$ is a waste water pipe leading from the bottom part of the cases $A^2 A^3$ to the lower compartment in the valve chest M. As shown in the drawings, the valve $m'$ has closed the opening in the diaphragm $m^5$, and has therefore closed the connection between the filtered water outlet pipes $K^3$ and $K^2$. Simultaneously, $m^6$ and $m^4$ are opened. The opening of $m^6$ affords communication between the pipes $K^2$ and $K^7$. The opening at $m^4$ opens the waste pipe $K'$, and allows the waste water to run off to the sink V. Assuming the valve $K^5$ to be closed, the mode of operation would be a circulation of water from the service pipe K through and around the outside of the filtering stones inside of the cases $A^2$ and $A^3$, and out through the pipe $K'$ into the sink V. This relieves the pressure against the outside of the filtering cylinders, and allows the filtered water from the storage tank $B'$, by virtue of its weight, to descend in the pipe $K^4$, passing through the connections into the interior of the filtering cylinders and through the filtering stone into the outer chamber, and thence through the pipe $K'$ into the waste sink V. The valve at $K^5$ being closed, it cannot pass directly into the filter $A^3$, but takes the course through $K^7$, through the opening in the diaphragm $m^6$, into the pipe $K^2$, and from thence into the interior of the filtering cylinder in $A^3$. Passing through the cylinder which leads in the reverse direction, it also enters the pipe $K'$, and from thence into the sink V. It is obvious that any number of filtering cylinders may be located and connected up with the pipes $K^2 K'$, without departing from this principle. This is the same as in the case of the apparatus shown in Fig. 1. The difference between the apparatus shown in Fig. 1 and that shown in Fig. 2, is that in Fig. 2 there is a straight connection between the source of supply and the filters, without any interposed valve; and, consequently, that the initial pressure is always furnished to all of the filters without being cut off, as in the apparatus shown in Fig. 1. When the storage tank $B'$ is filled, the filter $A^2$ can be cut off therefrom by closing the valve $K^6$ and opening the valve $K^5$. It then filters in common with the filter $A^3$, or any others that may be located along the line of the pipes as hereinbefore suggested. If the storage tank $B'$ is of sufficient size, the filter $A^2$ can be left in the battery, and the water filtering through it used for consumption, until the storage tank $B'$ becomes substantially exhausted through the operation of cleansing. By opening the valve $K^6$, and closing valve $K^5$, the head of water in the tank $B'$ can be restored at any time.

In Fig. 3, I have shown another modification, in which $A^4$ is a filter connected with a storage tank $B^2$, and $A^5$ a filter connected up in a line of supply for general purposes, substantially the same as that of $A'$ and $A^3$. P is the source of supply which leads into a valve chamber $P'$, where it may be interrupted as herein described, or continued in the pipe $P^2$. This connects with the upper portion of the filtering cases, and furnishes the water supply, the filters being of a similar construction to that shown at F. A branch pipe, $p$, leads from the pipe $P^2$ to a dumping tank H. This dumping tank, together with its accompanying lever and weight, is of similar construction to that shown in Figs. 1 and 2, and needs no further description. Connected to the lever is a valve stem S, carrying thereon valves $s$, $s'$, $s^2$ and $s^3$. These valves close appropriate openings in diaphragms located within the valve chest $P'$ and a valve chest $P^3$. The valves within the valve chest $P^3$ direct the flow of water from the discharge pipes R $R'$. One of the valves within the valve chest $P'$ closes the supply inlet, and the other opens the waste water outlet. The valve $s^3$, when open, permits waste water to flow into the sink V, from the waste pipe $R^2$, which communicates with the lower portion of the chamber outside of the filtering cylinders in the filters $A^4$ and $A^5$. Filtered water pipe R communicates by appropriate connections with the inside of the filtering cylinders, receiving filtered water therefrom in the same manner as hereinbefore described. Valves $r \, r'$ are located in the pipe R upon either side of the outlet for filtered water from the filtering cylinder $A^4$. They are analogous to and operate exactly the same as the valves $K^5$ and $K^6$ in the pipe $K^2$ of Fig. 2. The filtered water is forced by the initial pressure through the filter $A^4$ when the valve $r$ is closed and the valve $r'$ opened into the reservoir $B^2$. The other filter, $A^5$, discharges into the reservoir for filtered water, $R^4$. If desired, filtered water may be pumped from reservoir $R^4$ into reservoir $B^2$, by means of a pump T and appropriate connections. As this has in itself nothing new, it needs no description. In case the initial pressure is not sufficient to raise the water to the storage tank $B^2$, and thus give sufficient head to force a reverse current through the filtering cylinders, the force pump T may be employed to raise the water for that purpose. This pump is shown to be operated by hand, but it could be operated by machinery, if desired, by any of the well known means for such purpose. It will be observed that, when the valve $s^2$ is open, permitting communication between the pipes P and $P^2$, the valve $s^3$ is closed, shutting off any escape of waste water, and thereby the service pressure forces the water through the filtering cylinders, and from thence from cylinder $A^5$ into the pipe R; and from the cylinder $A^4$, when the valve $r$ is closed, into the pipe $R^3$. The pipe R leads into the central compartment of the valve case $P^3$, the valve $s$ is closed, and the valve $s'$ is open, permitting communication with, and the discharge of water through, the pipe $R'$ into the reservoir $R^4$. When the waste water from the pipe $p$ overbalances the weight W, the valves $s^2$ and $s'$ are closed, and the valves $s$ and $s^3$ are opened. The water from the storage tank $B^2$, owing to the removal of the initial pressure, begins to flow through the filtering cylinders in the reverse direction, that in $A^4$ coming directly from pipe R and discharging through the pipe $R^2$, and that in cylinder $A^5$ passing through the pipe $R^4$, into the upper compartment of the valve chest $P^3$, past the valve $s$, through the pipe R and its connection, into the interior of the filtering cylinder in the filter $A^5$. Passing through the filtering cylinder, it is discharged by the pipe $R^2$, past the valve $s^3$, into the sink V. The filter $A^4$ may be thrown into communication with, and discharged into, the tank $R^4$, by closing the valve $r'$ and opening the valve $r$, in the same manner as the filtering cylinders A and $A^2$ in Figs. 1 and 2.

The mode of operation of the foregoing device will be sufficiently understood from the description and detailed statements of the operation of each part respectively. It frequently happens that the initial pressure is so great that, if used at its full power for cleansing purposes (when the pressure is from within outward), it will burst the stone.

To strengthen the stone, I employ a strengthening band of wire or similar suitable material, which I wind in a coil around the block of stone. This is shown at 4ª in Fig. 4, where 4ᵇ indicates the block of stone employed by me, and 4ª the coil of wire around it.

What I claim is—

1. In a filtering machine, the combination of a series of filters, a supply pipe connecting therewith, a discharge for filtered water, a storage tank adapted to receive filtered water for the purposes of washing the filters separate from the usual discharge thereof, a filter in the line of communication between the filtered water supply and said storage tank, and means whereby the same is adapted to exclusively filter into the storage tank to furnish filtered water for reverse washing through all the filters, substantially as described.

2. In a filtering machine, the combination of a series of filters, a supply pipe connecting therewith, a discharge for filtered water, a storage tank adapted to receive filtered water for the purposes of washing the filters separate from the usual discharge thereof, a filter in the line of communication between the filtered water supply and said storage tank, means whereby the same is adapted to exclusively filter into the storage tank to furnish filtered water for reverse washing through the filters, and means whereby the current of filtered water is established in the reverse direction from the storage tank through the filters to a waste, substantially as described.

3. In a filtering machine, the combination of two or more filters arranged in a battery, means whereby a reverse current of filtered water can be established through the same, an air valve located in the supply pipe adjacent to the filters, whereby, on the release of the pressure from the service pipe, the air may be permitted to enter the filtering chambers and facilitate the washing by reverse currents, substantially as described.

4. In a filtering machine, the combination of two or more filters arranged in a battery, means whereby one of them may be used to store water for reversing through the other, a storage tank therefor, and means whereby the filter may be restored to the battery and be disconnected from delivery into the storage tank.

5. In a filtering machine, a self-cleansing apparatus, consisting of the combination of an automatic discharge tank, means connected therewith for discharging and periodically filling the same, valve chests with valves therein, whereby the waste is alternately opened and closed, a secondary valve chest located in the line of the discharge pipe, valves located therein, means whereby the same are operated by the initial pressure or the withdrawal of the initial pressure from the service pipe, said means being located upon the filter side of the first named valve chest, connections from filter to a storage of filtered water through said secondary valve chest for washing purposes, and means whereby the main filtered water supply is cut off and a current established from said storage of filtered water in a reverse direction through the filtering cylinders, and from thence through a waste discharge, substantially as described.

6. In combination with a filter, a suitable inlet pipe, an outlet pipe for waste water, an outlet pipe for filtered water branching to two storage tanks, one being for wash water and one for service water, a valve in the inlet pipe and a valve in the waste pipe, means automatically actuated by a slow filling balance tank for throwing said valves, a valve adapted to direct the flow of filtered water to one or the other of the two storage tanks, means actuated by the relative pressure of the water in the feed pipe and the water in the wash water tank and adapted to throw said last mentioned valve, substantially as specified.

7. The process of alternate filtering and cleansing, consisting of dividing the feed water into parts, utilizing one part for filtering, and utilizing another part for automatically and periodically tripping the valves which direct the flow of water through the various pipes,—dividing the filtered water into parts, utilizing one part for consumption, and storing another part under pressure to be subsequently used for reversing back through the filtering material, utilizing the filtered water so stored by forcing it back by the pressure against which it was stored through the filtering material, and allowing the water to escape, substantially as specified.

8. In a filtering apparatus, the combination of two or more filters, one of which is arranged to discharge its filtered water into a tank independent of the discharge from the main supply filter, means for closing the discharge from the main filter and opening the supply from the tank and causing a reverse action through all the filters into the waste outlet, substantially as described.

9. In a filtering apparatus, the combination of two or more filters, one of which is arranged to discharge its filtered water into a tank independent of the discharge from the main supply filter, means for simultaneously closing the discharge from the main filter and opening the supply from the tank and causing a reverse action through all the filters into the waste outlet, substantially as described.

10. In a filtering apparatus, the combination of two or more filters, one of which is arranged to discharge its filtered water into a tank independent of the discharge from the main supply filter, means for automatically closing the discharge from the main filter and opening the supply from the tank and causing a reverse action through all the filters into the waste outlet, substantially as described.

11. In a self cleansing filter, the combination with the main service pipe of a storage tank, independent thereof in which water is stored under compressed air, and means whereby filtered water is periodically and automatically admitted into and released from said tank, the admission being simultaneous with the filtering of feed water into the filter, and the release being simultaneous with the closing off of the flow of feed water, substantially as described.

12. In a self cleansing filter, the combination with the main service pipe of a tank of water independent thereof and containing an air cushion, means whereby the filtered water outlet from the filter is periodically and automatically closed simultaneously with the opening of the supply from said tank, causing the water from the tank to pass through the filtering material in a reverse direction to that it had when filtering, and to discharge into the waste, substantially as described.

13. In a self cleansing filter, the combination of a tank of water independent of the main service and means whereby the filtered water outlet from the filter is periodically and automatically closed simultaneously with the opening of the supply of said tank, causing the water from said tank to pass through the filtering material in a reverse direction to filtering, and discharge into the waste, substantially as described.

In testimony whereof I sign this specification in the presence of two witnesses.

JUNIUS A. BOWDEN.

Witnesses:
MARION A. REEVE,
F. CLOUGH.